US012769499B2

(12) United States Patent
Rodriguez

(10) Patent No.: US 12,769,499 B2
(45) Date of Patent: Oct. 20, 2026

(54) DEVICE, METHOD, AND SYSTEM FOR PORTABLE INTERACTIVE DEVICE

(71) Applicant: READTYCH Corp., Houston, TX (US)

(72) Inventor: Reinaldo Rodriguez, League City, TX (US)

(73) Assignee: READTYCH, CORP., Houston, TX (US)

( * ) Notice: Subject to any disclaimer, the term of this patent is extended or adjusted under 35 U.S.C. 154(b) by 0 days.

(21) Appl. No.: 18/202,909

(22) Filed: May 27, 2023

(65) Prior Publication Data

US 2023/0385009 A1 Nov. 30, 2023

Related U.S. Application Data

(60) Provisional application No. 63/346,734, filed on May 27, 2022.

(51) Int. Cl.
*G06F 3/14* (2006.01)
*G06F 1/16* (2006.01)
*G06F 3/041* (2006.01)
*G06F 3/16* (2006.01)

(52) U.S. Cl.
CPC .......... *G06F 3/1431* (2013.01); *G06F 1/1681* (2013.01); *G06F 3/0412* (2013.01); *G06F 3/165* (2013.01)

(58) Field of Classification Search
CPC .... G06F 1/1681; G06F 3/0412; G06F 3/1431; G06F 3/165; G06F 3/016; H04M 1/022
See application file for complete search history.

(56) References Cited

U.S. PATENT DOCUMENTS

| | | | | |
|---|---|---|---|---|
| 7,355,338 B2 * | 4/2008 | Osame | ................ | H04M 1/0247 345/1.3 |
| 8,613,061 B2 * | 12/2013 | Dvorak | ................ | G06F 1/1654 709/224 |
| 9,361,853 B2 * | 6/2016 | Yamazaki | .............. | G09G 5/003 |
| 9,996,115 B2 * | 6/2018 | Yamazaki | ............. | G06F 1/1616 |
| 10,849,241 B2 * | 11/2020 | Cavenagh | .............. | A45C 11/00 |
| 10,915,145 B2 * | 2/2021 | Yamazaki | ............ | G09G 3/3225 |
| 11,147,174 B2 * | 10/2021 | Cavenagh | ............ | G06F 1/1647 |
| 11,513,562 B2 * | 11/2022 | Yamazaki | ............ | G09G 3/3225 |
| 12,228,971 B2 * | 2/2025 | Yamazaki | ............ | G06F 1/1652 |
| 2002/0021258 A1 * | 2/2002 | Koenig | ................. | G06F 1/1641 345/1.1 |
| 2005/0040753 A1 * | 2/2005 | Osame | .................. | G06F 1/1616 313/493 |
| 2005/0096082 A1 * | 5/2005 | Chang | ................... | G06F 1/1616 455/575.4 |
| 2006/0211454 A1 * | 9/2006 | Park | .................... | H04M 1/0214 361/600 |
| 2007/0085759 A1 * | 4/2007 | Lee | ................... | H04M 1/72403 |

(Continued)

*Primary Examiner* — Olga V Merkoulova
(74) *Attorney, Agent, or Firm* — Williams, Morgan, P.C.; Jaison C. John; Terry D. Morgan

(57) ABSTRACT

Embodiments herein are directed to an interactive remote device system that provides mobile data display and interactive features. The system may comprise a portable electronic device that is capable of displaying various types of information, such as book-pages displayed by an electronic book (eBook) device, news stories, magazine contents, multimedia, hypertext, hypermedia, video, and various other type of formatted data.

18 Claims, 11 Drawing Sheets

(56) References Cited

U.S. PATENT DOCUMENTS

| | | | | |
|---|---|---|---|---|
| 2008/0112113 | A1* | 5/2008 | Sawadski | H04M 1/0218 361/679.23 |
| 2012/0026069 | A1* | 2/2012 | Ohsaki | H04M 1/0247 345/1.2 |
| 2012/0311438 | A1* | 12/2012 | Cranfill | G06F 3/0488 715/256 |
| 2013/0083467 | A1* | 4/2013 | Becze | G06F 3/00 361/679.27 |
| 2014/0035794 | A1* | 2/2014 | Chen | G06F 3/1431 345/1.3 |
| 2014/0331781 | A1* | 11/2014 | Lee | G06F 3/0487 73/849 |
| 2014/0347264 | A1* | 11/2014 | Lee | G06F 1/1652 345/156 |
| 2015/0317120 | A1* | 11/2015 | Kim | G06F 1/1686 345/1.3 |
| 2016/0274623 | A1* | 9/2016 | Yamazaki | G06F 1/1616 |
| 2018/0348824 | A1* | 12/2018 | Yamazaki | G06F 1/1635 |
| 2019/0189042 | A1* | 6/2019 | Aurongzeb | G06F 1/1681 |
| 2019/0286217 | A1* | 9/2019 | da Veiga | G06F 1/1677 |
| 2020/0042045 | A1* | 2/2020 | Quinn | G06F 1/1624 |
| 2020/0053892 | A1* | 2/2020 | Cavenagh | H04B 1/3888 |
| 2020/0110566 | A1* | 4/2020 | Reeves | G06F 9/00 |
| 2020/0241604 | A1* | 7/2020 | Nakamura | G06F 1/1618 |
| 2021/0022260 | A1* | 1/2021 | Cavenagh | H05K 5/0226 |
| 2021/0149449 | A1* | 5/2021 | Yamazaki | G06F 1/1616 |
| 2022/0066509 | A1* | 3/2022 | Yee | G06F 1/162 |
| 2024/0061471 | A1* | 2/2024 | Yamazaki | G06F 1/1652 |

* cited by examiner

DEVICE, METHOD, AND SYSTEM FOR PORTABLE INTERACTIVE DEVICE

BACKGROUND OF THE INVENTION

Field of the Invention

Generally, the present disclosure relates to portable electronic devices, and more specifically, to interactive portable electronic devices for reading, writing, and taking notes, viewing videos, viewing photos, viewing maps, and/or the like.

Description of the Related Art

Dissemination of electronic media is increasingly important in daily life. Advancements in data communications have allowed for increased distribution of information, such as articles, books, etc. So-called "eBooks" have been developed to display content, such as web pages, books, etc.

Some eBooks have been designed in such a manner to provide the user with an experience similar to reading a book. Generally, these eBooks comprise a single screen, similar to a convention Tablet device. Moreover, many state-of-the-art eBooks have memory for storage of data and generally comprise a single screen. Although eBooks have some advantages over paper books, such as increased storage, eBooks are still not preferred by many users. State-of-the-art eBooks generally fail to mimic a traditional, physical paper book. To date, the use of eBooks has yet to attain widespread usage among readers. The awkwardness of handling current eBooks, coupled with the lack of features of those eBooks have prevented widespread usage of eBooks or similar devices. Thus, there remains a need for improving the experience of using a remote information device or system.

This is particularly of relevance because literacy problems remain a concern not only in the United States of America (U.S.A.), but also across the world. There are discouraging studies that show that reading is fundamentally underutilized, which causes many negative consequences. For example, according to Pew Research, in the U.S.A., about 28% of adults Americans have not read a single book in the last 12 months. Other research shows that in the U.S.A., many people only read for about twenty minutes daily, including all activities that involve reading. In contrast, research shows that those people spend approximately three hours watching television. Still further, research performed by the American Psychological Association reveals that fewer than 20% of teenagers in the U.S.A. report reading a book, magazine, or newspaper daily for pleasure. In contrast, over 80% of those teenagers report using social media every day. This dearth of reading can cause developmental issues, reduction in productivity, and reduced overall knowledge levels among the population. There is a need for systems that improve the use of technology to promote improvements in reading.

The present disclosure may address and/or at least reduce one or more of the problems identified above.

SUMMARY OF THE INVENTION

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

Embodiments of the present invention provide for an apparatus configure to provide interaction for a plurality of displays of a remote device system. The apparatus comprises a first display; a second display; and an interconnect portion operatively coupled to the first and second displays. The interconnect portion is configured to provide for rotational movements of the first and second portions with respect to the interconnect portion. The first and second displays are configured to display information and wherein at least of the first and second displays is capable of receiving at least one user input.

Embodiments of the present invention also provide for an interactive remote device system that provides for mobile data display and interactive features. The system may comprise a portable electronic device that is capable of displaying various types of information, such as book-pages displayed by an electronic book (eBook) device, news stories, magazine contents, multimedia, hypertext, hypermedia, video, and various other type of formatted data.

Embodiments of the present invention also provide for an interactive remote device system that provides for mobile data display and interactive features. The device comprises a wireless interface configured to provide wireless communications between the portable interactive device and at least one external electronic device. The device also comprises a wireless interface configured to provide wireless communications between the portable interactive device and at least one external electronic device. The device further comprises a wi-fi interface configured to provide wireless communications between the portable interactive device and at least one external electronic device; or a Bluetooth Interface configured to provide wireless communications between the portable interactive device and at least one external electronic device.

BRIEF DESCRIPTION OF THE DRAWINGS

The disclosure may be understood by reference to the following description taken in conjunction with the accompanying drawings, in which like reference numerals identify like elements, and in which.

Figure 1:
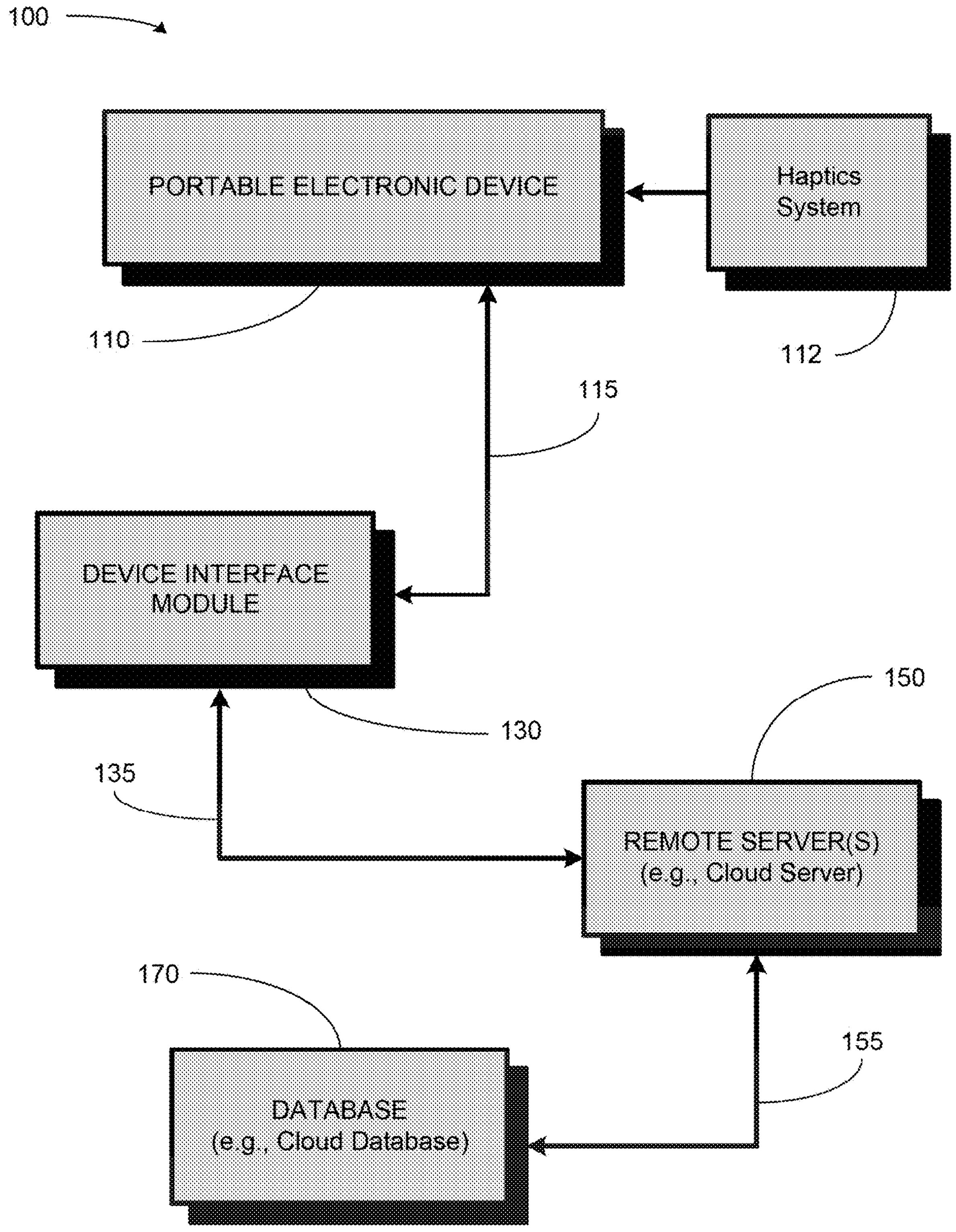
FIG. 1 depicts a stylized block diagram depiction of an interactive remote device system 100, in accordance with embodiments herein.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

DETAILED DESCRIPTION

Various illustrative embodiments of the disclosure are described below. In the interest of clarity, not all features of an actual implementation are described in this specification. It will, of course, be appreciated that, in the development of any such actual embodiment, numerous implementation-specific decisions must be made to achieve the developers' specific goals, such as compliance with system-related and business-related constraints, which will vary from one implementation to another. Moreover, it would be appreciated that such a development effort might be complex and time-consuming but would be a routine undertaking for those of ordinary skill in the art having the benefit of this disclosure.

The present subject matter will now be described with reference to the attached figures. Various structures, systems and devices are conceptually depicted in the drawings for purposes of explanation only and to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for an interactive remote device system that provides for mobile data display and interactive features. For example, the system may comprise a portable electronic device or a portable information device that is capable of displaying various types of information, such as book-pages displayed by an electronic book (eBook) device, news stories, magazine contents, multimedia, hypertext, hypermedia, video, and various other type of formatted data. Further, the portable electronic device may be operatively coupled with other devices, such a remote server (e.g., cloud server), an external database (e.g., cloud database), etc.

In some embodiments, the interactive remote device may be utilized as an electronic reader in place of a traditional book. The electronic reader may have the look and feel of a traditional book. In some embodiments, the interactive remote device may be configured as a device that can be folded similar to a book, wherein the interactive remote device may comprise at least two screens to mimic the left-hand and right-hand pages of a traditional book. In some embodiments, the interactive remote device may comprise two primary screens on, or forming, interior surfaces of the foldable portion of the device. In other embodiments, an additional third screen may be configured on the outside of the foldable portion of the device, mimicking an outer cover of a book.

Figure 8:
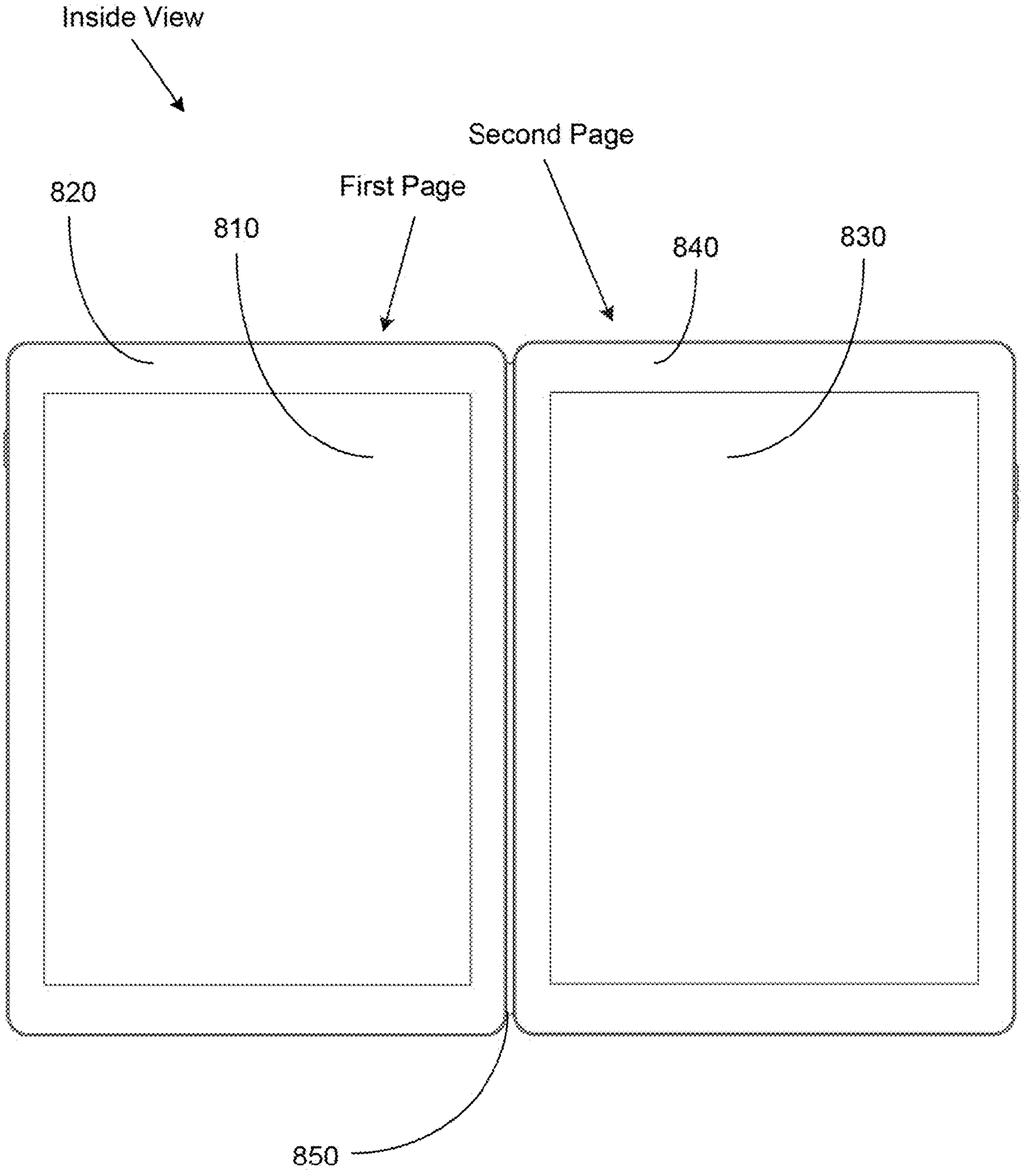
FIG. 8 illustrates a stylized inner view of the portable electronic device in an opened configuration, in accordance with the embodiments herein.

Turning now to FIG. 1, a stylized block diagram depiction of an interactive remote device system 100, in accordance with embodiments herein, is illustrated. The interactive remote device system 100 comprises a portable electronic device 110. In some embodiments, the portable electronic device 110 may be embodied as a portable eBook reader device. Referring simultaneously to FIGS. 1 and 8, the portable electronic device 110 is a foldable device that may be opened in a manner that reveals a first screen 810 embodying a first page, and a second screen 830 embodying a second page.

The portable electronic device 110 is capable of displaying printed and/or digital works. Printed and/or digital works include, but are not limited to, books, newspapers, magazines, journals, periodicals, reference materials, textbooks, instruction manuals, maps, notes, forms, directories, etc.

Figure 2:
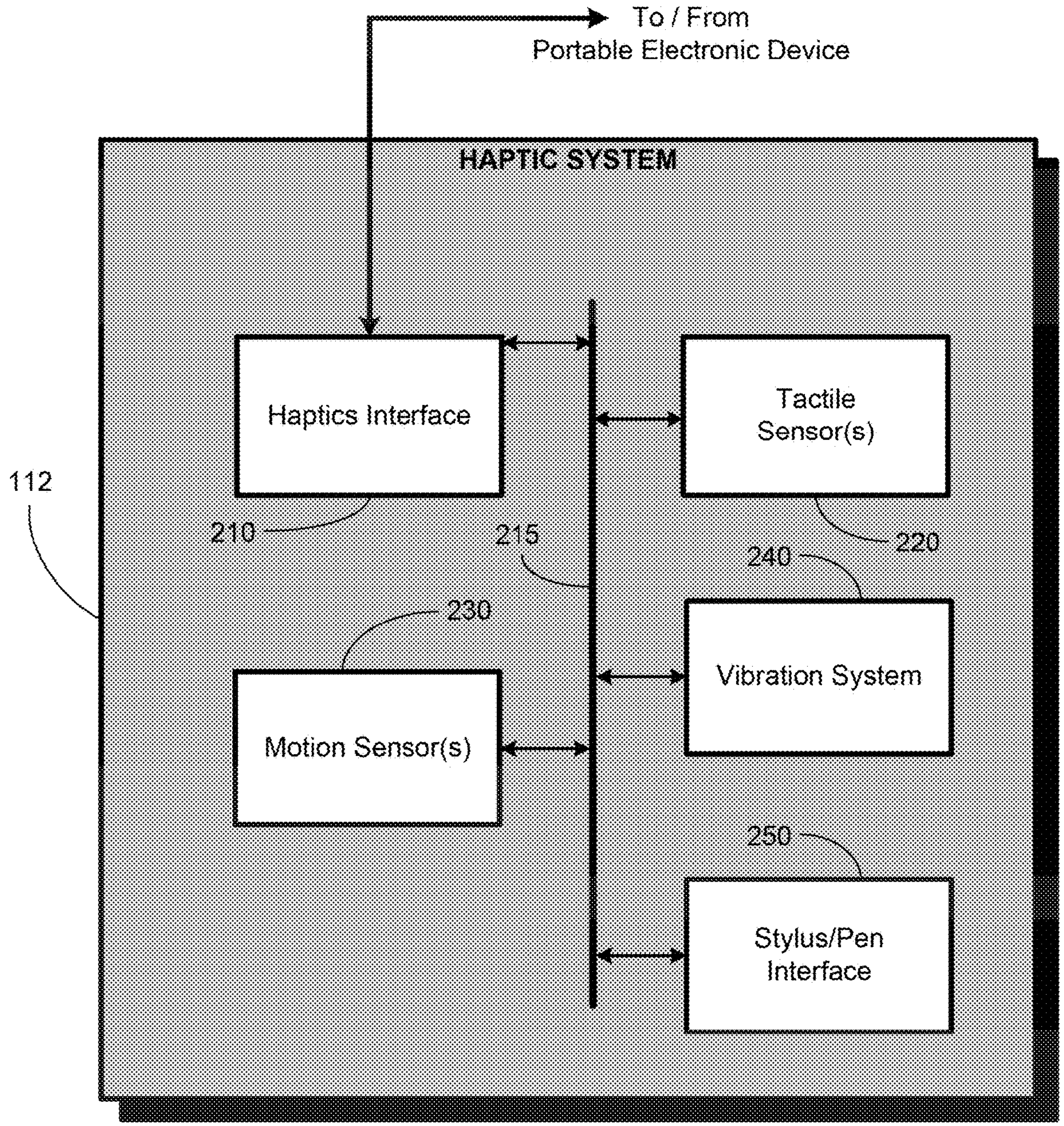
FIG. 2 depicts a stylized a block diagram depiction of a haptic system interactive remote device system of FIG. 1, in accordance with embodiments herein.

The first and second pages of the first and second screens 810, 830 respectively, may comprise a feature wherein a reader can advance to the next page with a gesture, such a swipe gesture similar to the swiping and advancing a page of a physical paper book. The portable electronic device 110 may provide a page turning feature that includes a tactile page turning feel such that a user may be able to turn the page in a similar fashion as turning pages of a physical paper book. Tactile features provided by the portable electronic device 110 may also be utilized in viewing and manipulating videos, photos, etc. Tactile features may be provided by the tactile sensor(s) 220 (FIG. 2).

The term "page" as referred to in embodiments herein may refer to a set of digital content that is presented at one time on the first and/or second screens 810, 830. In some embodiments, the term "page" as used in embodiments herein may refer to a virtual frame of the content, or a visual display window presenting the digital content to the user. In those embodiments the term "pages" are not fixed permanently, in contrast to the pages of physical paper books. Instead, pages described herein may be redefined or repaginated when, for example, the user chooses a different font for displaying the content in the first and/or second screens 810, 830. In other embodiments, the term "page" may refer to a set of content that corresponds to a page of a physical paper book, magazine, newsletter, and/or the like.

The first and second screens 810, 830 may be comprised of various types of display screens, such as electronic paper (e.g., electronic paper offered by E-ink Corporation), Liquid Crystal Display (LCD) screen, bi-stable LCD, PN LCD, TFT, organic LED, MEMs, pigmented electrophoretic, cholesteric, and/or the like.

The portable electronic device 110 may also function as an interactive device, wherein the first and second screens 810, 830 may receive input from the user and provide various display in response to such input. This interactive feature is described in further details below. Further, a more detailed description of the portable electronic device 110 is provided in FIG. 5 and accompanying description below.

With continued reference to FIG. 1, in some embodiments, the interactive remote device system 100 also comprises a haptic system 112. The haptic system 112 block depicted in FIG. 1 may comprise one or more individual haptic devices and interface(s) for providing various manners of interaction between the user and the portable electronic device 110. The haptic system 112 is capable of providing interaction with the interactive remote device system 100 based on touch, vibrations, and/or motions of the user. In some embodiments, the haptic system 112 may be a standalone module separate from the portable electronic device 110, while in other embodiments, the haptic system 112 may be integrated into the portable electronic device 110.

Turning now to FIG. 2, a block diagram depiction of a haptic system interactive remote device system 100, in accordance with embodiments herein, is illustrated. The haptic system 112 may comprise a haptics interface 210. The haptics interface 210 comprises circuitry known to those skilled in the art having benefit of the present application, which are capable of facilitating interaction between a user and the portable electronic device 110. The haptic system 112 may also comprise one or more tactile sensor(s) 220 that are adapted to measure forces exerted by the user and provide information indicative of such forces to the haptics interface 210. The haptic interface 210 may communicate with one or more tactile sensor(s) 220 and other components of the haptic system via a data bus 215 or a backplane.

The haptic system 112 may also comprise one or more motion sensor(s) 230. The motion sensor(s) 230 may be capable of detecting motions or gestures provided by the user. The motion sensors 230 may also be capable of providing data indicative of such motion to the haptic interface 210. The detected motion may include various movements made by the user, including particular hand gestures that may be coded to have particular command correlations, such as “turn page,” “turn on,” “turn off,” etc. The motion sensors 230 may be operatively coupled with the haptics interface 210 via the date bus 215.

The haptic system 112 may also comprise a vibration system 240. The vibration system 240 is operatively coupled to the haptics interface 210. The vibration system 240 is capable of providing a vibratory response to the user based on certain signals from the portable electronic device 110. The vibration system 240 is capable of providing a variety of vibration responses, such as long vibration, short vibration, pulse vibrations, intermittent pulse vibrations, etc. Each of these particular types of vibration responses may be correlated to certain predetermined responses.

The haptic system 112 may also comprise a stylus/pen interface 250. The stylus/pen interface 250 is operatively coupled to the haptics interface 210. The stylus/pen interface 250 is capable of providing an input to the portable electronic device 110. An input received from the stylus/pen interface 250 may be processed by the haptics interface 210, which may send data relating to the input to the portable electronic device 110. In some embodiments, the portable electronic device 110 is capable of providing a vibration sensation back to the user via the stylus/pen interface 250, using the vibration system 240.

Returning to FIG. 1, the interactive remote device system 100 also comprises a device interface module 130. The device interface module 130 is capable of providing communications between the portable electronic device 110 and external devices. For example, the interactive remote device system 100 may include one or more remote server(s) 150. The remote servers 150, in some embodiments, may be cloud server, while in other embodiments, may be a network server. The device interface module 130 is capable of providing data services (e.g., data request processing, data transfer, etc.) between the remote servers 150 and the portable electronic device 110.

The interactive remote device system 100 may also comprise a database 170. In some embodiments, the database 170 may be a cloud database, while in other embodiments, may be a network database. Information from the database 170 may be displayed on the screens of the portable electronic device 110. The request and transfer of data between the database 170 may be controlled by the remote servers 150. In some embodiments, the database 170 may be a relational database.

The lines labeled 115, 135, and 155 may represent one or more types of communication infrastructure, including but not limited to Ethernet network connection, wireless connection, data buses, etc. Moreover, the various blocks illustrated in FIG. 1 may be comprised, wholly or partially, of hardware, software, and/or firmware modules.

Figure 3:
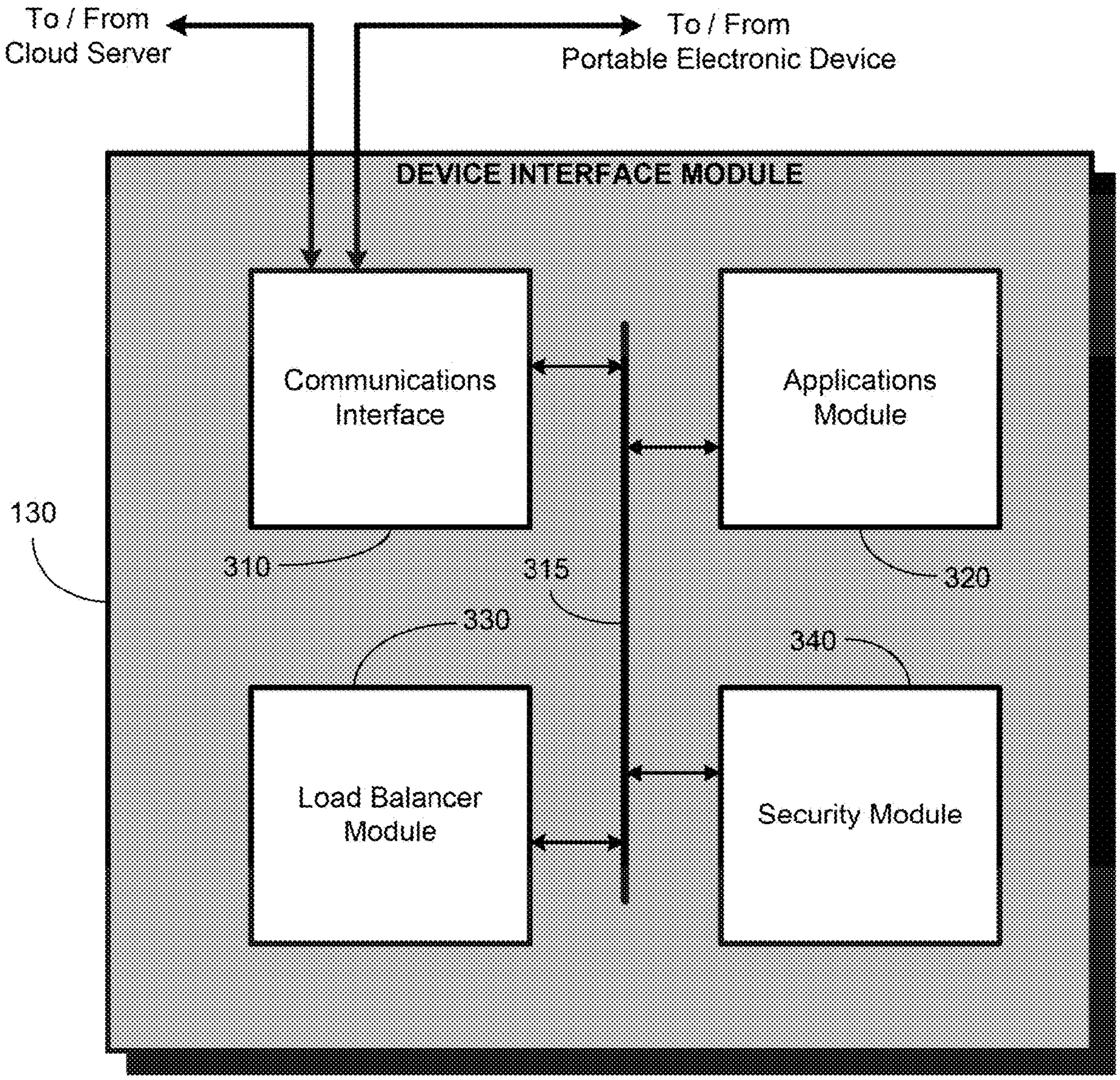
FIG. 3 depicts a stylized block diagram depiction of a device interface module, in accordance with embodiments herein.

Turning now to FIG. 3, a stylized block diagram depiction of the device interface module 130, in accordance with embodiments herein, is illustrated. The device interface module 130 is capable of providing communications between the portable electronic device 110 and external devices, e.g., the remote servers 150, the database 170, and/or other external devices. The device interface module 130 comprises a communication interface 310 that provides for communications between the electronic device 110 and external devices. The communications interface 310 may comprise various circuitry and buffers that clock data in and out based on predetermined data routing protocols. The communications interface 310 may comprise a plurality of data ports of various types. The communications interface 310 may also comprise circuitry configured to provide for wired and/or wireless communications. In some embodiments, the communications interface 310 may provide for synchronous or asynchronous communications.

The device interface module 130 also comprises a load balancer module 330. The load balancer module 330 is capable of providing for improved efficiency in transmitting date between the portable electronic device 110 and other external devices. For example, the load balancer module 330 is capable of dividing and/or packaging incoming and outgoing data over a plurality of data paths. This process may be performed to reduce bandwidth problems, congestion, and loss of data. In this manner the load balancer module 330 is capable of distributing incoming and outgoing data traffic to and from multiple devices.

The device interface module 130 also comprises a security module 340. The security module 340 is capable of providing various security features to provide safeguards for communications between the portable electronic device 110 and external devices, e.g., the remote servers 150, the database 170, and/or other external devices. For example, the security module 340 comprises circuitry that is capable of managing digital keys for authentication and access. Further, the security module 340 may provide various other cryptographic functions, including various levels of authentication. The security module 340 may also provide encryption and decryption functionalities.

The device interface module 130 also comprises an applications module 320. The applications module 320 is configured to facilitate digital interactions and communications between the portable electronic device 110 and external devices, e.g., the remote servers 150, the database 170, and/or other external devices. For example, the applications module 320 allows for seamless transfer of information from the database 170, via the remote servers 150, to the portable electronic device 110. The portable electronic device 110 may then display the data as eBook pages to a user. A more detailed description of the applications module 320 is provided in FIG. 4, and accompanying descriptions below.

Figure 4:
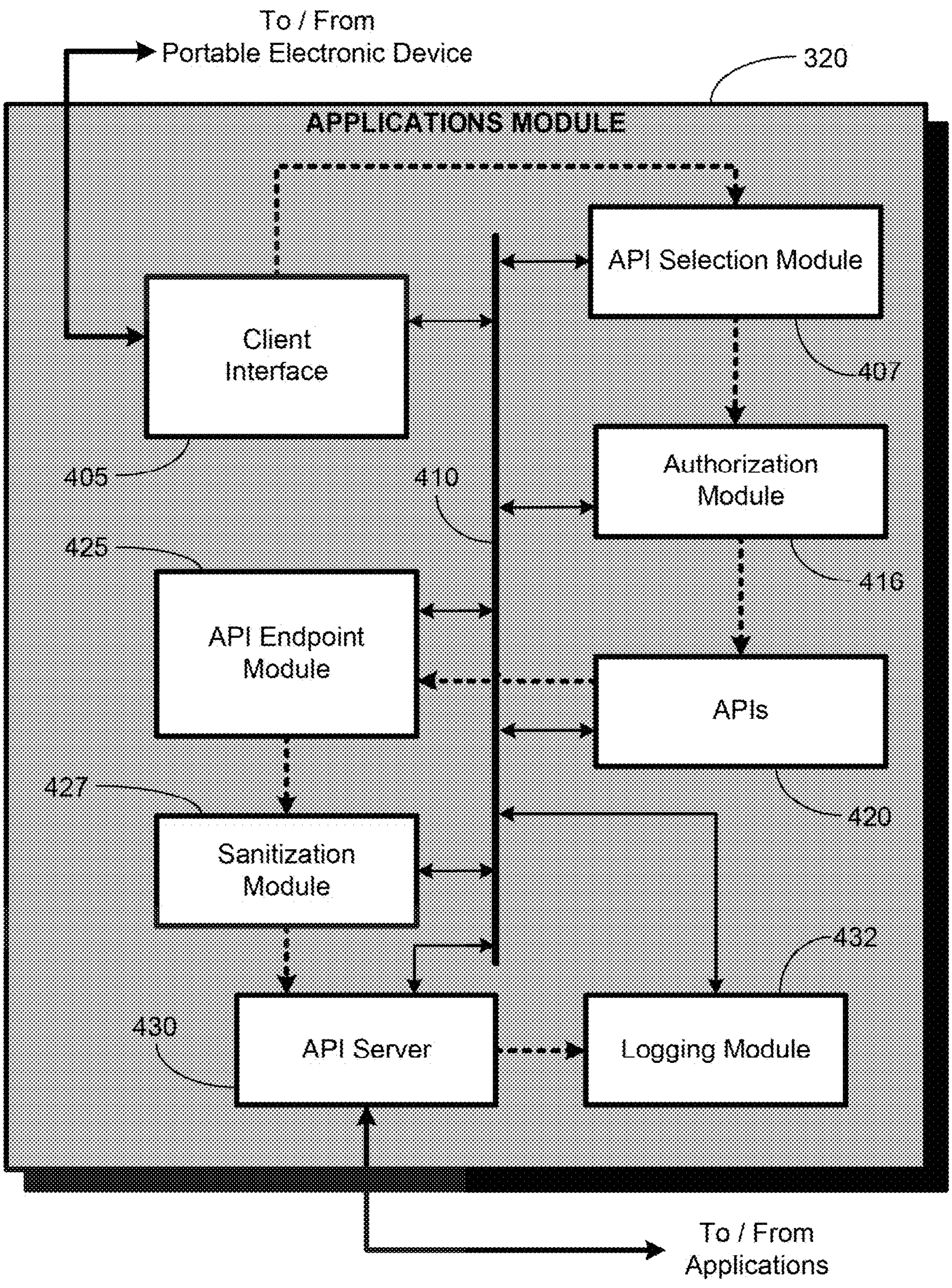
FIG. 4 illustrates a stylized block diagram depiction of an applications module 320, in accordance with embodiments herein.

Turning now to FIG. 4, a stylized block diagram depiction of the applications module 320, in accordance with embodiments herein, is provided. The applications module 320 comprises a client interface 405, which may be adapted to provide communications with one or more client devices (e.g., remote servers 150, the database 170, and/or other external devices) from the perspective of the portable electronic device 110. The client interface 405 may be a platform-independent module that provides access to distributed resources. The client interface 405 allows the portable electronic device 110 to interact with various applications in remote devices.

The applications module 320 also comprises an API selection module 407. In some embodiments, based on a request from the portable electronic device 110, the API selection module 407 may perform a selection process to obtain services from one or more applications that may reside inside and/or outside the portable electronic device 110. For example, upon receiving a request for obtaining a book, the applications selection module 407 may select web-services application as well as an online eBook application, which may operate to provide the requested book to the portable electronic device 110. The API selection module 407 may then select certain APIs for communications. As a non-limiting example, the API selection module 407 may select a reading content API, a payment API, a Maps API, a pay-per-request API, a cloud API, a database API, and/or the like.

The applications module 320 may also comprise an authorization module 416. Based upon information from the API selection module 407, the authorization module 416 may confirm whether authorization to the selected application may be provided. This authorization may be based on various authorization protocols known to those skilled in the art having benefit of the present disclosure.

The applications module 320 may also comprise a plurality of application programming interfaces (APIs) 420. If authorization is confirmed, the authorization module 416 may communicate with one or more APIs 420 to indicate as much. The APIs perform various functions that are known to those skilled in the art having benefit of the present disclosure. Examples of APIs may include, but are not limited to a reading content API, a payment API, a Maps API, a pay-per-request API, a cloud API, a database API, and/or the like.

The applications module 320 may also comprise an API endpoint module 425. The API endpoint module 425 allows for communication between multiple software modules. For example, the API endpoint module 425 allows for software modules residing within the portable electronic device 110 to communicate with external applications, such as eBook reader applications, database applications, etc. The API endpoint module 425 may provide information as to where the APIs can access certain application resources.

The applications module 320 may also comprise a sanitization module 427. The sanitization module 427 is capable of encoding special characters as plain text for communications. Further, the sanitization module 427 is capable of stripping potentially dangerous protocols for security purposes. The sanitization functions performed by the sanitization module 427 may be performed on an API endpoint specific basis.

The applications module 320 may also comprise an API server 430. After the sanitization process, the API server facilitates communications between the portable electronic device 110 and external/remote applications. The API server 430 may perform the direct communications between the applications module 320 and interfaces of external/remote applications. The communications between the various components of the applications module 320 may be performed via a data bus and/or a backplane connection (410) between those components. Further, the dotted lines in FIG. 4 may be indicative of additional direct communications between these components.

Figure 5:
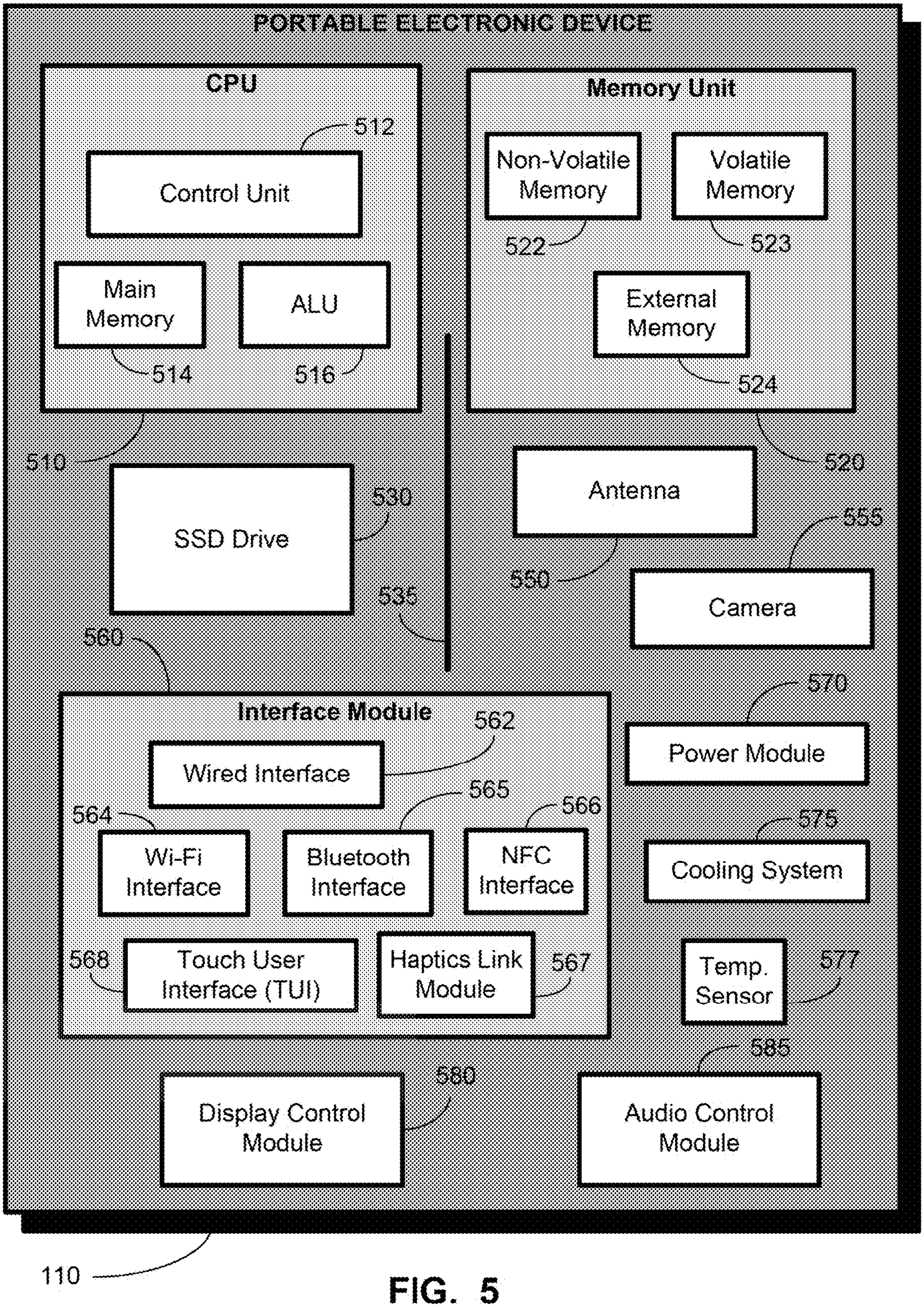
FIG. 5 illustrates a stylized depiction of the portable electronic device of FIG. 1, in accordance with embodiments herein.

Turning now to FIG. 5, a stylized depiction of the portable electronic device 110 of FIG. 1, in accordance with embodiments herein, is illustrated. The portable electronic device 110 comprises a CPU 510. In some embodiments, the CPU 510 may be a processor, a microprocessor, a controller, a Field Programmable Gate Array (FPGA), an application-specific integrated circuit (ASIC), and/or the like.

The CPU 510 may comprise, among other circuitry known to those skilled in the art, a control unit 512. The control unit is capable of executing various programs that may be stored in the main memory 514. The main memory 514 may comprise volatile and/or non-volatile memory, e.g., RAM, DRAM, etc. The CPU 510 may also comprise an arithmetic logic unit (ALU) 516. The ALU 516 is capable of performing various operations including binary operations, floating point operations, graphic processing, etc.

The portable electronic device 110 also comprises a memory unit 520. The memory unit 520 comprises non-volatile memory 522, volatile memory 523, and external memory 524. In some embodiments, the CPU 510 may access programs, etc., from the memory unit 520. Further, the portable electronic device 110 may also comprise an SSD drive 530 that is capable of storing a variety of data files.

The portable electronic device 110 may also comprise one or more cameras 555, e.g., front facing camera(s), rear-facing camera(s), side-camera(s), etc. Each of the cameras may be of different accuracy, sensitivity, etc.

The portable electronic device 110 also comprises an antenna 550. In some embodiments, the antenna 550 may take the form of a plurality of antennas that are capable of providing for reception and/or transmission of signals of various frequencies. The antenna 550 may comprise various type of wire antennas, log period antennas, aperture antennas, microstrip antennas, reflector antennas, lens antennas, travelling-wave antennas, array antennas, and/or the like.

The portable electronic device 110 also comprises an interface module 560. The interface module 560 may comprise various interfaces configured for providing communications between the portable electronic device 110 and external devices. For example, the interface module 560 may comprise a wired interface 562, a Wi-Fi interface 564, a Bluetooth interface 565, a near-field communications (NFC) interface 566, a touch user interface (TUI) 568, a haptics link module 567, etc. These and other similar interfaces may provide wired and wireless communications between the portable electronic device 110 and external devices.

The portable electronic device 110 also comprises a display control module 580 and an audio control module 585. The display control module 580 is capable of controlling various displays provided by the portable electronic device 110. The display control module 580 may also provide a user with the ability to input control signals. The audio control module 585 is capable of controlling various audio output provided by the portable electronic device 110. The audio control module 585 may also enable a user with the ability to control audio features of the portable electronic device 110. In some embodiments, the audio control module 585 may also comprise one or more speakers or other devices that can provide an audible output. In some embodiments, the audio output device may be separate from the audio control module 585.

The various blocks described in the portable electronic device 110 may be operatively coupled via one or more data bus 535 and/or backplane. The portable electronic device 110 also comprises a power module 570 for controlling the power and operation of the portable electronic device 110. A temperature sensor 577 is capable of measuring the temperature of the portable electronic device 110, as well as surrounding ambient temperature. Information provided by the temperature sensor 577 may be utilized by the CPU 510 to control one or more operations of a cooling system 575 of the portable electronic device 110. The cooling system 575 may be a passive cooling system, an active cooling system, or a combination thereof.

The portable electronic device 110 is capable of operating a number of software platforms. These platforms may utilize various libraries to provide users of the portable electronic device 110 access to various books, music entertainment, games, etc. The database 170 may comprise various libraries that may be accessed by the portable electronic device 110. For example, a library stored in the database 170 may facilitate a store platform to offer books, memberships, or accessories for sale or rental access. In some embodiments, the user may be provided with an experience that may be similar to a feel and/or emotion as visiting a library in person. The portable electronic device 110 may provide for one or more applications (apps) that provides such an experience. In some embodiment, artificial intelligence may be used to guide a user in experiencing the store platform. For example, a number of inquisitive, predetermined questions may be presented to a user. Based on the response to such questions, the user may be provided an experience of visiting a library, such as walking through the halls of a library displaying various reading operations. The user may be prompted to select one or more selections based on interactive prompts next to a reading option.

As another example, the portable electronic device 110 may provide a bookshelf type application (app). In this app, the user may be able to display reading materials (e.g., books, magazines, articles, etc.) liked or purchased by the user. This display may be made in a bookshelf type display and may be interactive. The reading materials may be organized according to the user's preference or a prediction of the user's preferences. Additional reading materials, such as materials likely to be desired by the user or other suggested reading materials, may be presented to the user for acquisition and/or use. The bookshelf may be configured to display reading material in a bookshelf type display.

As another example, the portable electronic device 110 may provide a notes-style application (app). The portable electronic device 110 may be configured to allow the user to make notes into the device 110. The notes may be made using finger sliding techniques, typing, verbal commands, stylus input, etc.

In some embodiments, the user may be able to make notes or make highlights into the reading material. The notes and/or highlights may be stored by the app for future reference and display. When the user returns to the app, the user may be able to check the notes and highlights, which may be classified by the type of reading materials.

When the user selects a particular reading material in which the user has made notes or highlights, the previously stored notes and highlights would appear in the reading material. The user may be able to jump to particular highlighted portion or notes. In some embodiment, when the user selects a particular note, the app may jump to the portion of the reading material on at least one of the screens of the portable electronic device 110. In this manner, the user may be able to access the content of the reading material to view the users' comments and highlights. Moreover, the app may provide the user with the ability to create folders and reading lists with different reading materials.

The portable electronic device 110 may also provide a community application (app). The community app allows for building networks. For example, the app may provide for connecting with reader and/or authors of certain materials. This app may provide for creating social groups, communities, etc. in which other users can interface with each other. For example, certain book clubs may be formed based on particular interests in the reading materials. Additional applications (apps) may be formed to provide calendar features, dictionary features, and/or other functionality.

Figure 6:
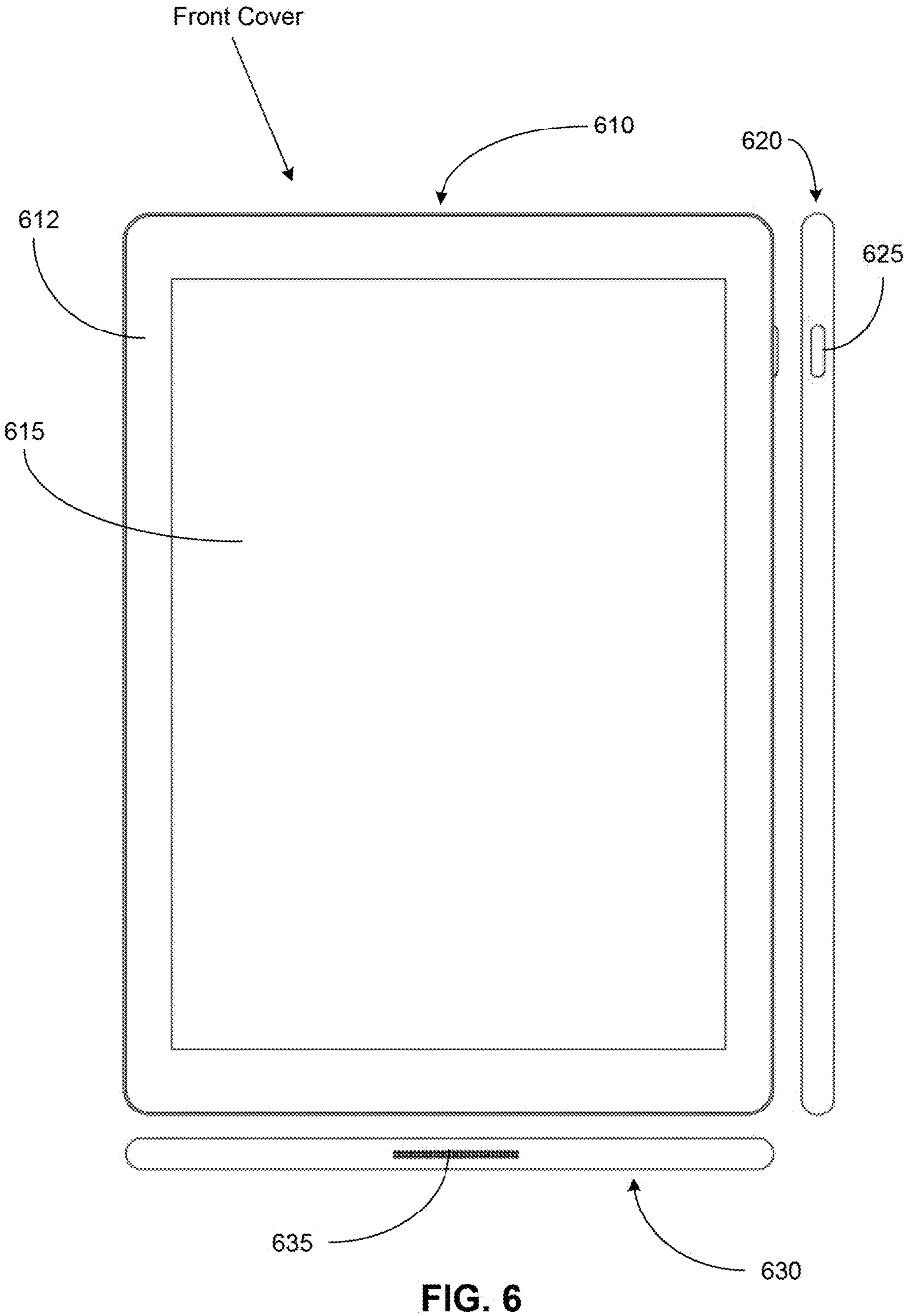
FIG. 6 illustrates a stylized front view of the portable electronic device, in accordance with embodiments herein.

Turning now to FIG. 6, a front view 610 of the portable electronic device 110, in accordance with embodiments herein. The portable electronic device 110 may include a front cover comprising a frame 610 and a front screen 615. The front screen 615 may be comprised of various types of display screens, such as electronic paper (e.g., electronic paper offered by E-ink Corporation), Liquid Crystal Display (LCD) screen, bi-stable LCD, PN LCD, TFT, organic LED, MEMs, pigmented electrophoretic, cholesteric, and/or the like. The screen 615 may provide various features, including mimicking the outer cover of book, magazine, etc.

FIG. 6 also illustrates a side front view 630 of the top portion of the portable electronic device 110. The portable electronic device 110 may comprise a connector 635, through which power and data interaction may be provided. Further this connector 635 may be used to provide a docking feature to a base station.

Figure 9:
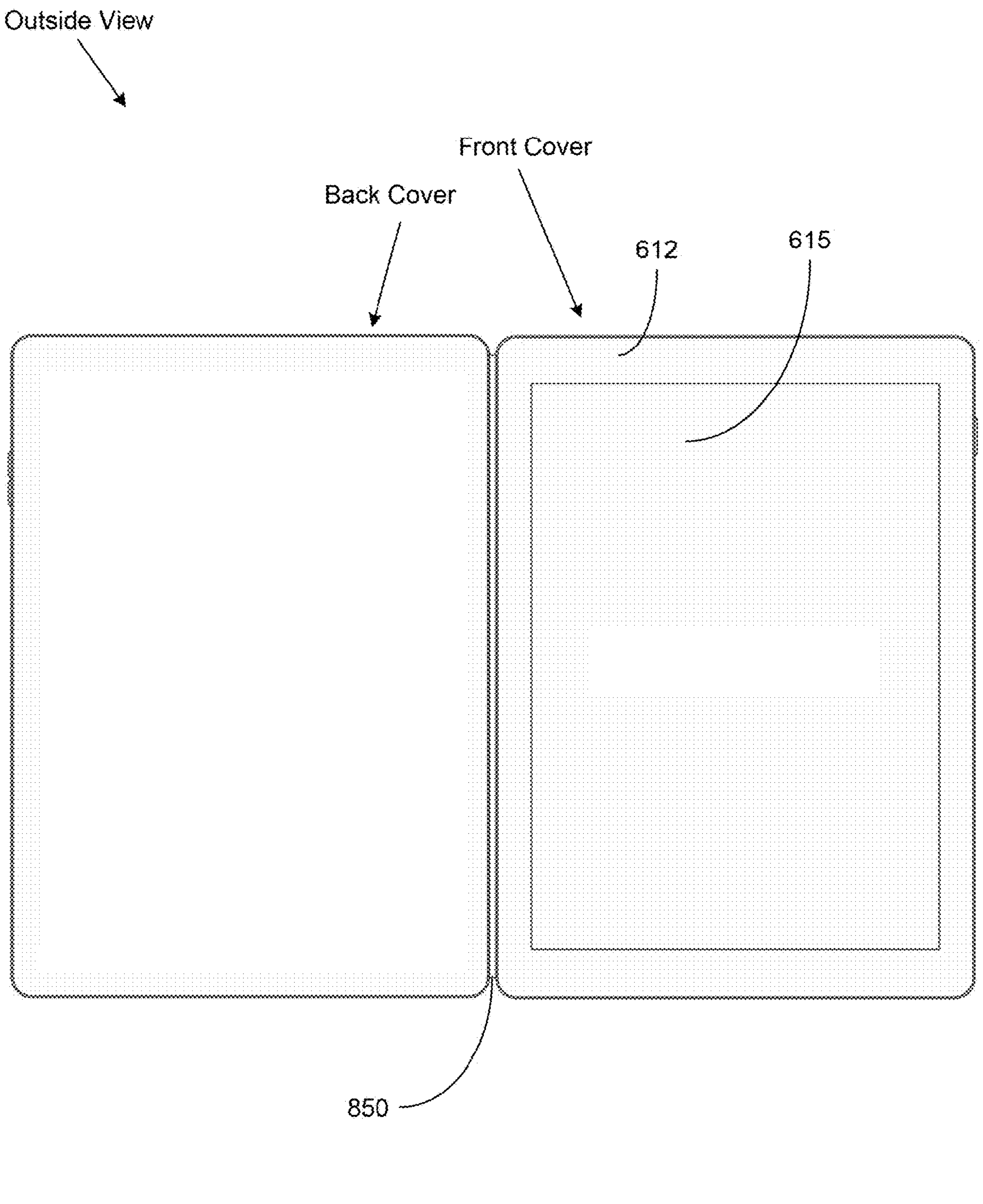
FIG. 9 illustrates a stylized outside view of the portable electronic device in an opened configuration, in accordance with the embodiments herein.

FIG. 6 also illustrates a first side view 620 of a side portion of the portable electronic device 110. The portable electronic device 110 may comprise a button 625 that may provide one or more functions, e.g., power, camera activation, app or screen scrolling, etc. The button 625 may provide different functions based on types of depression employed by the user, e.g., single depression, double depression, triple depression, etc. FIG. 9 illustrates a rear view of the portable electronic device in an opened configuration is provided. The front cover may comprise the frame 612 and the front screen 615.

Figure 7:
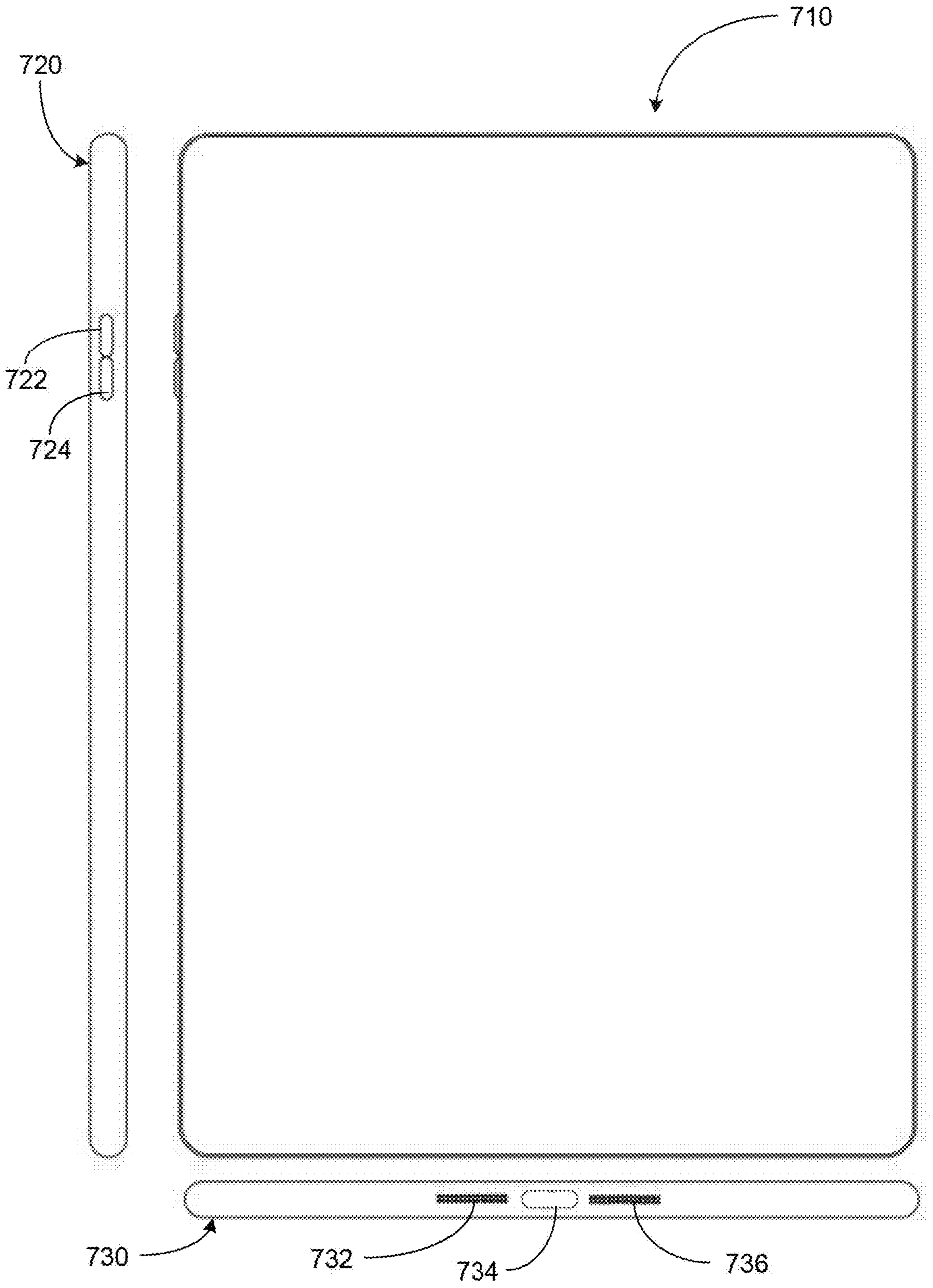
FIG. 7 illustrates a stylized rear view of the portable electronic device, in accordance with embodiments herein.

Turning now to FIG. 7, a front view 710 of the portable electronic device 110, in accordance with embodiments herein. In one embodiment, the rear portion of the portable electronic device 110 may be a solid material. In alternative embodiment, the rear portion of the portable electronic device 110 may comprise yet another screen.

FIG. 7 also illustrates a bottom view 730 of the portable electronic device 110. This portion 730 may comprise a first connector 732 and a second connector 736. These connectors or ports 732, 736 may provide for power transmission and/or data transmission. Further the bottom portion 730 may comprise a depressible button 734 that may be programmed to perform one or more functions. The button 734 may provide different functions based on types of depression employed by the user, e.g., single depression, double depression, triple depression, and/or so on. For example, the button 734 may provide for advancing a page, advancing to another reading material, dimming the screen, and/or other functions.

Turning now to FIG. 8, a stylized view of the portable electronic device in an open configuration, in accordance with the embodiments herein, is illustrated. The first and second pages of the first and second screens 810, 830 respectively, may comprise a feature wherein a reader can advance to the next page with a gesture, such a swipe gesture similar to the swiping and advancing a page of a physical paper book. The screens 810, 830 may be respectively encapsulated a frame 820 of the first page and a frame 840 of the second page. The first and second pages may be operative and/or mechanically coupled by the spine 850. The spine 850 may be an interconnect device, which is capable of operatively coupling a first, second, and third screens. The spine 850 may also be configured to provide functionalities of interconnecting the first, second and third screens while providing for rotational movements of the first, second, and third screens with respect to the spine 850.

The spine 850 may comprise some portion of the electronics described above and/or power supplies. The first and second pages may act as the corresponding pages of a book, while the front screen 610 may act as the book cover. The user may be allowed to lock the pages as to prevent accidental advancement of the pages.

The first and second pages of the first and second screens 810, 830 respectively, may comprise a feature wherein a reader can advance to the next page with a gesture, such a swipe gesture similar to the swiping and advancing a page of a physical paper book. Further, the user may have the option to skip multiple pages at one time by scrolling on the top corner of the portable electronic device 110. Further, the user may have an option to open a blank screen for note taking, wherein the notes may be stored by the portable electronic device 110.

The first and second screens 810, 830 may be comprised of various types of display screens, such as electronic paper (e.g., electronic paper offered by E-ink Corporation), Liquid Crystal Display (LCD) screen, bi-stable LCD, PN LCD, TFT, organic LED, MEMs, pigmented electrophoretic, cholesteric, and/or the like. The portable electronic device 110 may also function as a portable interactive device, wherein the first and second screens 810, 830 may receive input from the user and provide various display in response to such input. In some embodiments, the first and second screens 810, 830 may be substantially abutted to the edge of the front cover portion of the portable interactive device 110. That is, in some embodiments, the first and second screens 810, 830 may occupy substantially the front cover portion of the portable interactive device 110.

FIG. 9 illustrates a stylized outside view of the portable electronic device in an opened configuration, in accordance with the embodiments herein. The front cover comprises the frame 612 and the front screen 615. The other side of the device is the back cover. The back cover and the front cover are separated and operatively coupled together with by the spine 850.

Figure 10:
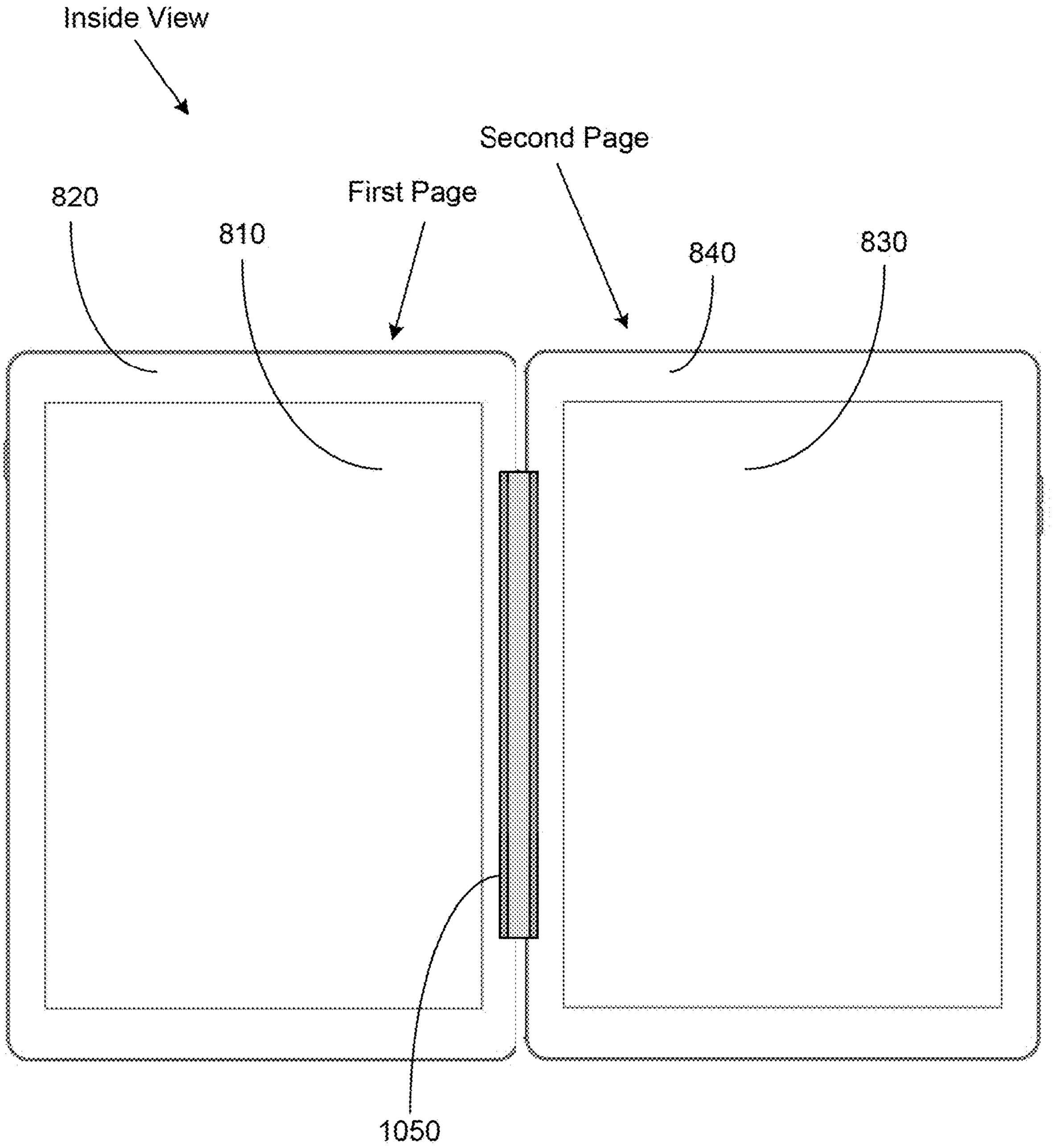
FIG. 10 illustrates a stylized outside view of the portable electronic device in an opened configuration, in accordance with alternative embodiments herein.

FIG. 10 illustrates a stylized outside view of the portable electronic device 110 in an opened configuration, in accordance with alternative embodiments herein. The first and second pages of the first and second screens 810, 830 respectively, may comprise a feature wherein a reader can advance to the next page with a gesture, such a swipe gesture similar to the swiping and advancing a page of a physical paper book. The screens 810, 830 may be respectively encapsulated in a frame 820 of the first page and a frame 840 of the second page.

The first and second pages may be operatively and/or mechanically coupled by a connector backplane 1050. The connector backplane 1050 may comprise some portion or all of the electronics described above and/or power supplies. The connector backplane 1050 may serve an electronic purpose and/or a mechanical purpose. The connector backplane 1050 may comprise mechanical features that allow for coupling of the first and second pages. Alternatively, or additionally, the connector backplane 1050 may comprise electronics to allow for operatively coupling the first and second pages. Further, the connector backplane 1050 comprise a motherboard or a plurality of PC boards that comprise electronics that provide for operation of the portable interactive device.

The first and second screens 810, 830 may act as the corresponding pages of a book, while the front screen 610 may act as the book cover. The user may be allowed to lock the pages to prevent accidental advancement of the pages. The first and second pages of the first and second screens 810, 830 respectively, may be similar to the corresponding screens described above with respect to FIG. 8.

Figure 11:
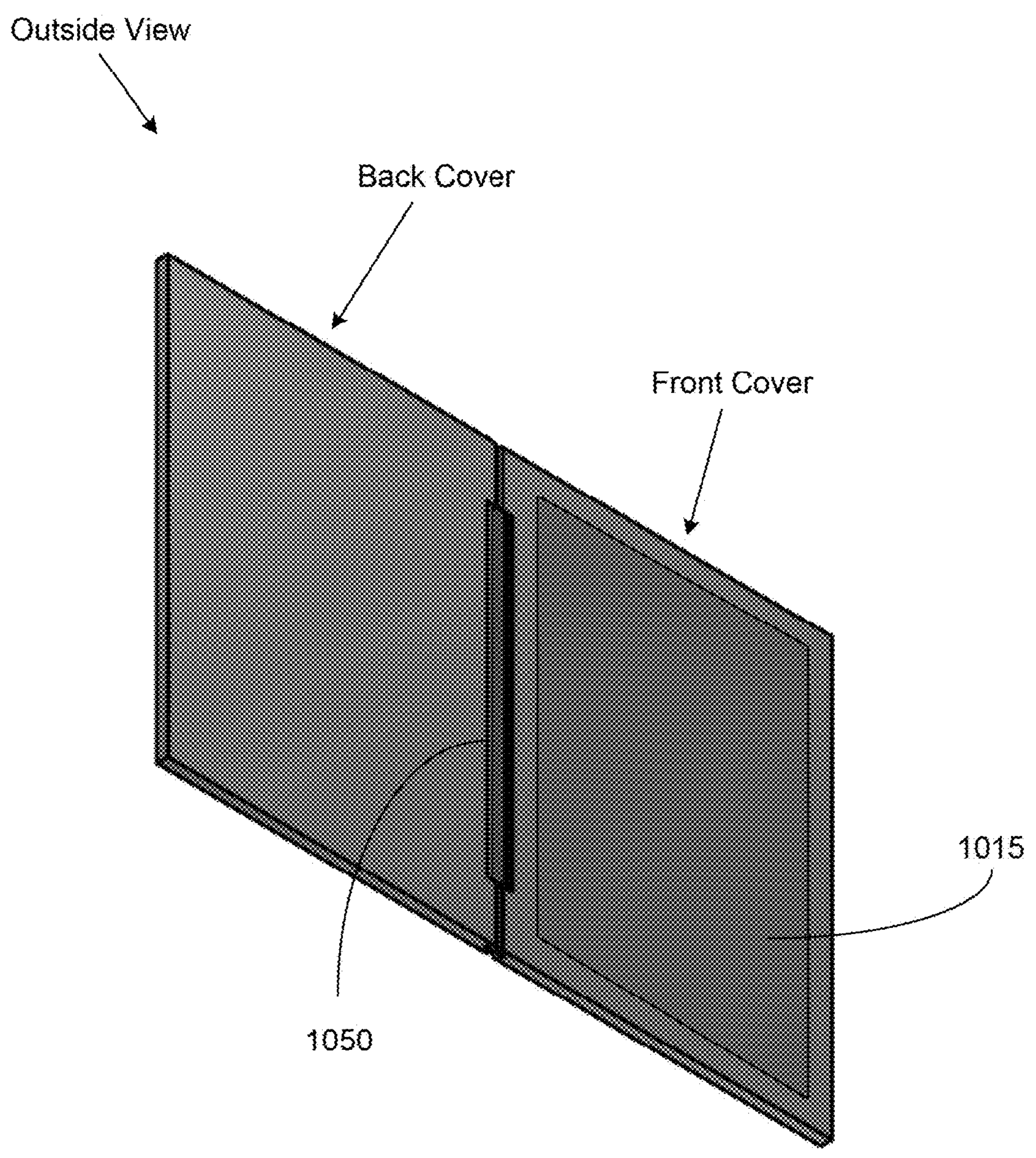
FIG. 11 illustrates a stylized isometric depiction of the portable interactive device of FIG. 10, in accordance with embodiments herein.

FIG. 11 illustrates a stylized isometric depiction of the portable interactive device 110 of FIG. 10, in accordance with embodiments herein. The isometric depiction of portable interactive 1000 device of FIG. 10 shows a front cover, a back cover and the connector backplane 1050. In addition to comprising electronics and one or more backplanes, the connector backplane 1050 is capable of allowing for virtually 360° rotation of the first and second screens 810, 830.

Those skilled in the art having benefit of the present disclosure would appreciate that the front cover and/or the back cover may comprise one or more screens, similar to the screens described above. For example, the front cover may comprise a front screen 1015. The front screen 1015 may be comprised of various types of display screens, such as electronic paper (e.g., electronic paper offered by E-ink Corporation), Liquid Crystal Display (LCD) screen, bi-stable LCD, PN LCD, TFT, organic LED, MEMs, pigmented electrophoretic, cholesteric, and/or the like. The screen 1015 may provide various features, including mimicking the outer cover of book, magazine, etc. In some embodiments, the front screen may be substantially abutted to the edge of the portable interactive device of FIG. 11.

For the avoidance of doubt, and in accordance with practice before the United States Patent and Trademark Office, none of the present figures are to scale.

The particular embodiments disclosed above are illustrative only, as the disclosure may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is, therefore, evident that the particular embodiments disclosed above may be altered or modified and all such variations are considered within the scope and spirit of the disclosure. Accordingly, the protection sought herein is as set forth in the claims below.

What is claimed is:

1. An apparatus, comprising:

a first display;

a second display;

a spine operatively coupled to the first and second displays, wherein the spine is configured to provide for rotational movements of the first and second portions with respect to the spine, said spine comprising at least one electronic circuit adapted to perform an operation of the apparatus; and wherein the first and second displays are configured to display information and wherein at least one of the first and second displays is capable of receiving at least one user input; and a third display configured on a reverse side of the first display and being oriented to display information to a user when the first display is not directly viewable by the user and wherein the first display is oriented to display information to a user when the third display is not directly viewable by the user, wherein the third display is configured to display a book cover.

2. The apparatus of claim 1, further comprising:

a central processing unit (CPU);

a memory unit operatively coupled to the CPU;

an interface module to provide communication between the apparatus and at least one external electronic device;

a display control module to provide control of display of information on the first and second displays; and audio control module to provide control of an audio output signal.

3. The apparatus of claim 2, wherein the interface module comprises at least one of:

a wireless interface configured to provide wireless communications between the apparatus and at least one external electronic device;

a wi-fi interface configured to provide wireless communications between the apparatus and at least one external electronic device; or a Bluetooth Interface configured to provide wireless communications between the apparatus and at least one external electronic device.

4. The apparatus of claim 2, wherein the interface module comprises at least one of:

a touch user interface configured to receive the user input, wherein the user input is a touch input from a user of the apparatus; and a haptics link interface configured to receive user input from a user of the apparatus based on at least one of:

a touch input from the user;

a vibration; or a motion of the user.

5. A portable interactive device, comprising:

a first portion comprising a first screen;

a second portion comprising a second screen;

a third portion comprising a third screen affixed to a reverse side of the first screen;

a spine operatively coupled to the first and second portions, wherein the spine is configured to provide for movement of the first and second portions such that the first and second portions may be positioned with the first screen and the second screen facing each other in a closed configuration and the third screen facing outward away from the first and second screens with the third screen being configured to display a book cover, and said spine comprising at least one electronic circuit adapted to perform an operation of the portable interactive device; and wherein the first, second, and third screens are configured to display information.

6. The portable interactive device of claim 5, further comprising:

a central processing unit (CPU);

a memory unit operatively coupled to the CPU;

an interface module to provide communication between the portable interactive device and at least one external electronic device;

a display control module to provide control of display of information on the first and second screens; and audio control module to provide control of an audio output signal.

7. The portable interactive device of claim 6, wherein the interface module comprises at least one of:

a wireless interface configured to provide wireless communications between the portable interactive device and at least one external electronic device;

a wi-fi interface configured to provide wireless communications between the portable interactive device and at least one external electronic device; or a Bluetooth Interface configured to provide wireless communications between the portable interactive device and at least one external electronic device.

8. The portable interactive device of claim 6, wherein the interface module comprises at least one of:

a touch user interface configured to receive a touch input from a user of the portable interactive device; and a haptics link interface configured to receive an input from a user of the portable interface device based on at least one of:

a touch input from the user;

a vibration; or a motion of the user.

9. The portable interactive device of claim 5, wherein the portable interactive device is an electronic reader (eReader).

10. The portable interactive device of claim 5, further comprising the third screen being oriented to display information to a user when the first display is not directly viewable by the user and wherein the first display is oriented to display information to a user when the third display is not directly viewable by the user.

11. The portable interactive device of claim 5, wherein the third screen is configured to display at least one of a book cover, a book page, a news article, a magazine content, a multimedia content, an hypertext content, an hypermedia, a video content, an audio content.

12. The portable interactive device of claim 5, wherein the first and second screens are configured to display at least one of a book page, a news article, a magazine content, a multimedia content, an hypertext content, an hypermedia, a video content, an audio content.

13. The portable interactive device of claim 5, wherein the spine comprises mechanical means to allow swiveling of the first and second portions about the spine.

14. A portable interactive device, comprising:

a first foldable portion comprising a first and third interactive display affixed together facing in opposite directions;

a second foldable portion comprising a second interactive display;

a spine operatively coupled to the first and second foldable portions, wherein the spine is configured to provide for opening and closing movements of the first and second foldable portions such that the first and second portions may be positioned with the first screen and the second screen facing each other in a closed configuration, said spine comprising at least one electronic circuit adapted to perform an operation of the portable interactive device; and wherein the first and second screens are configured to display information and interactive communications, and the third screen is configured to display a book cover.

15. The portable interactive device of claim 14, further comprising:

a central processing unit (CPU);

a memory unit operatively coupled to the CPU;

an interface module to provide communication between the portable interactive device and at least one external electronic device;

a display control module to provide control of display of information on the first and second screens; and audio control module to provide control of an audio output signal.

16. The portable interactive device of claim 15, wherein the interface module comprises at least one of:

a wireless interface configured to provide wireless communications between the portable interactive device and at least one external electronic device;

a wi-fi interface configured to provide wireless communications between the portable interactive device and at least one external electronic device; or a Bluetooth Interface configured to provide wireless communications between the portable interactive device and at least one external electronic device.

17. The portable interactive device of claim 15, wherein the interface module comprises at least one of:

a touch user interface configured to receive a touch input from a user of the portable interactive device; and a haptics link interface configured to receive an input from a user of the portable interface device based on at least one of:

a touch input from the user;

a vibration; or a motion of the user.

18. The portable interactive device of claim 14, wherein the portable interactive device is an electronic reader (eReader).

* * * * *